United States Patent [19]

Wichman et al.

[11] Patent Number: 5,351,843
[45] Date of Patent: Oct. 4, 1994

[54] FOLDING DISPLAY FRAME FOR FORMING COLUMN-LIKE STRUCTURES

[75] Inventors: William J. Wichman, 702 Brownsage Dr., Glendora, Calif. 91740; David E. Robertson, Glendora, Calif.

[73] Assignee: William J. Wichman, Glendora, Calif.

[21] Appl. No.: 874,028

[22] Filed: Apr. 27, 1992

[51] Int. Cl.⁵ .............................................. A47B 43/00
[52] U.S. Cl. .................... 211/195; 211/182; 52/646; 52/109; 40/610; 248/166
[58] Field of Search ............ 211/195, 182, 189; 248/166, 165; 52/109, 646, 655; 160/135; 40/610

[56] References Cited

U.S. PATENT DOCUMENTS

| | | | |
|---|---|---|---|
| 4,276,726 | 7/1981 | Derus | 248/166 X |
| 4,475,323 | 10/1984 | Schwartzberg et al. | 52/646 X |
| 4,599,832 | 7/1986 | Benton et al. | 52/646 X |
| 4,658,560 | 4/1987 | Beaulieu | 211/182 X |
| 4,791,761 | 12/1988 | Goudie | 52/109 |
| 4,970,841 | 11/1990 | Zeigler | 52/646 |
| 4,986,016 | 1/1991 | Wichman | 52/109 X |
| 5,123,550 | 6/1992 | Nodskov et al. | 211/182 |

Primary Examiner—Alvin C. Chin-Shue
Assistant Examiner—Korie H. Chan
Attorney, Agent, or Firm—Christie, Parker & Hale

[57] ABSTRACT

A collapsible portable framework is expanded to an open position forming a long, narrow, column-like structure for a folding display frame, in which generally rectangular frame-like cubicles are aligned serially and are pivotally joined at common ends of the cubicles. Each cubicle has hubs at its corners pivotally joined to ends of rigid rods interconnected at pivot points forming a pair of scissor members along opposite sides of each cubicle. End braces releasably interlock as a rigid box frame to support the ends of the scissor members and the hubs at the corners of the cubicles in rigid spaced-apart positions. A diagonal cross-brace extends from a lower front corner to an upper rear corner of each cubicle, and another diagonal cross-brace extends from an upper front corner to a rear lower corner of each cubicle. Disconnection of the end brace members permits the frame to be collapsed by folding the scissor members so the cubicles are collapsed into a compact side-by-side form. Preferred end support members comprise a pair of rigid U-frames affixed to corresponding hubs at the ends of the cubicle so that base portions of each U are movable adjacent to one another. A pin and socket affixed to the base portions of the adjacent U-frames are interlocked to hold the U-frames in a rigid supporting position at each end of the cubicles and are released to pivot the U-frame away from one another during folding of the scissor members to the compact form of the frame structure.

30 Claims, 13 Drawing Sheets

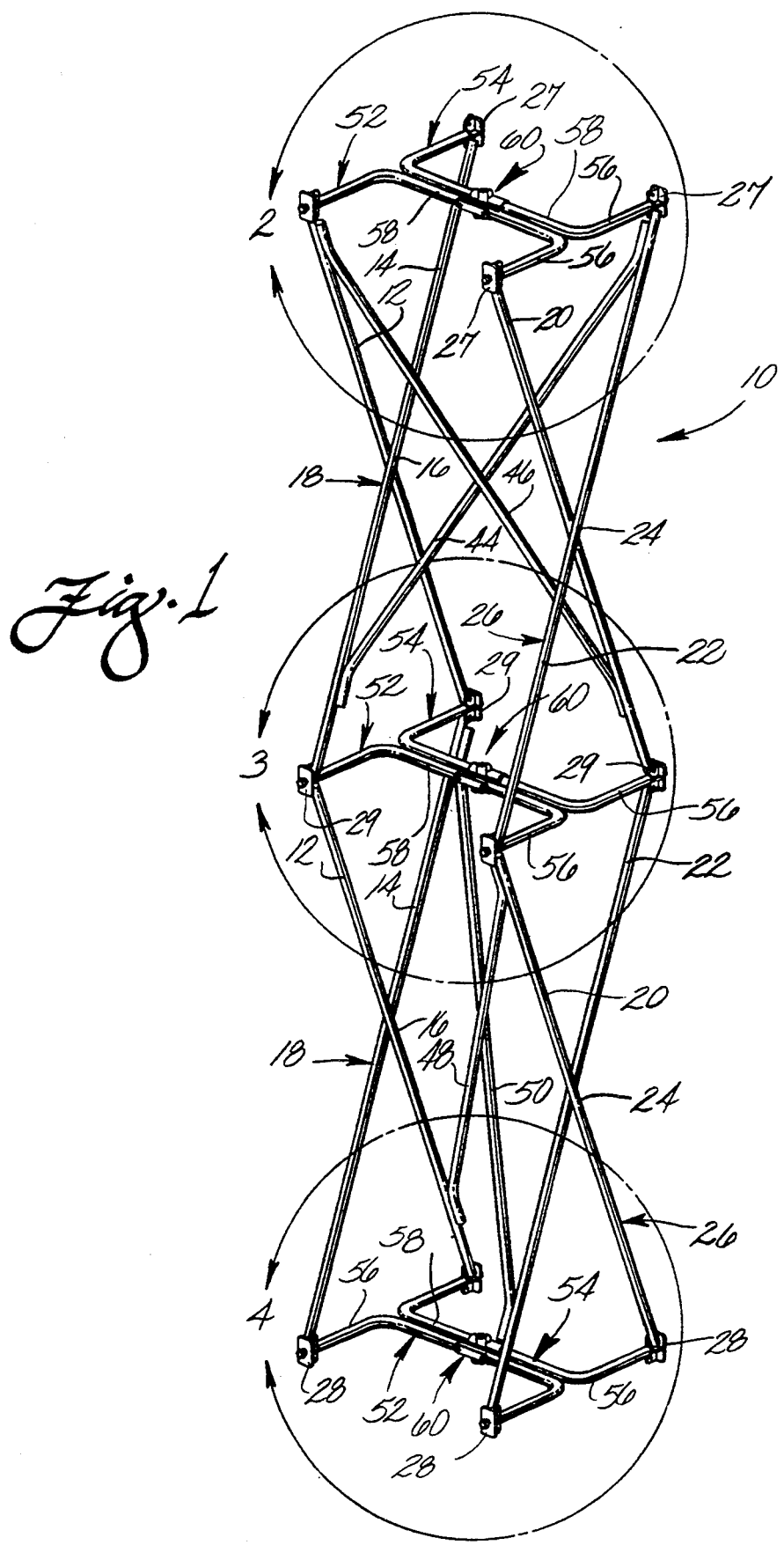

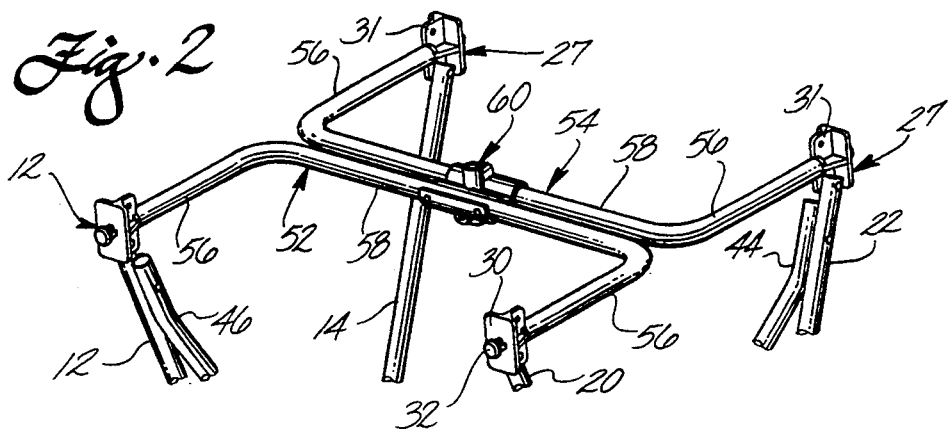
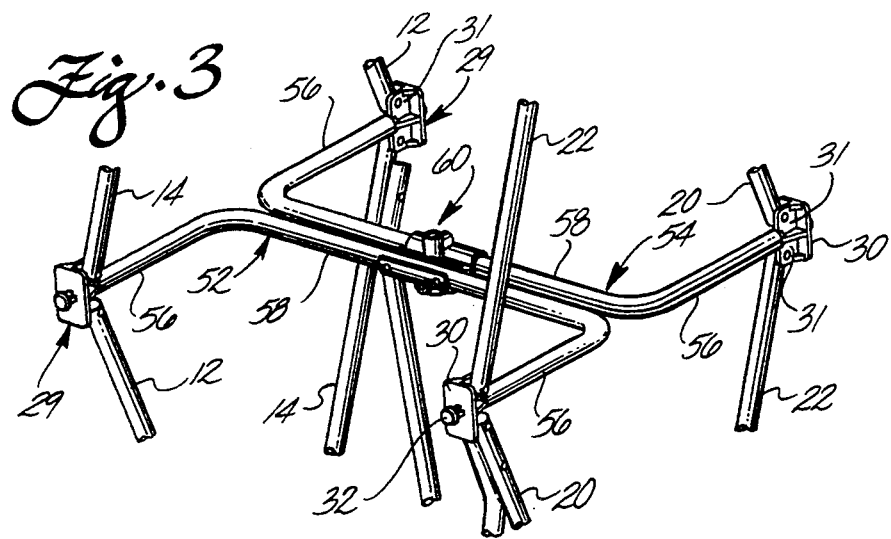
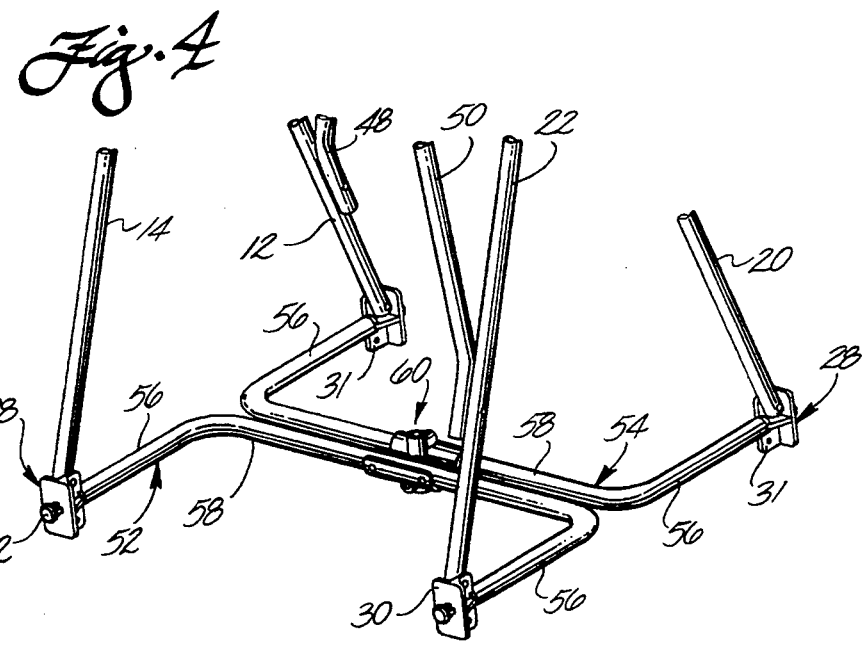

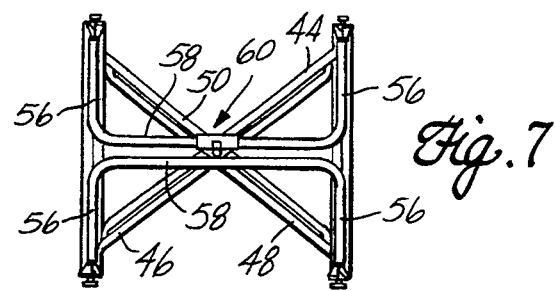
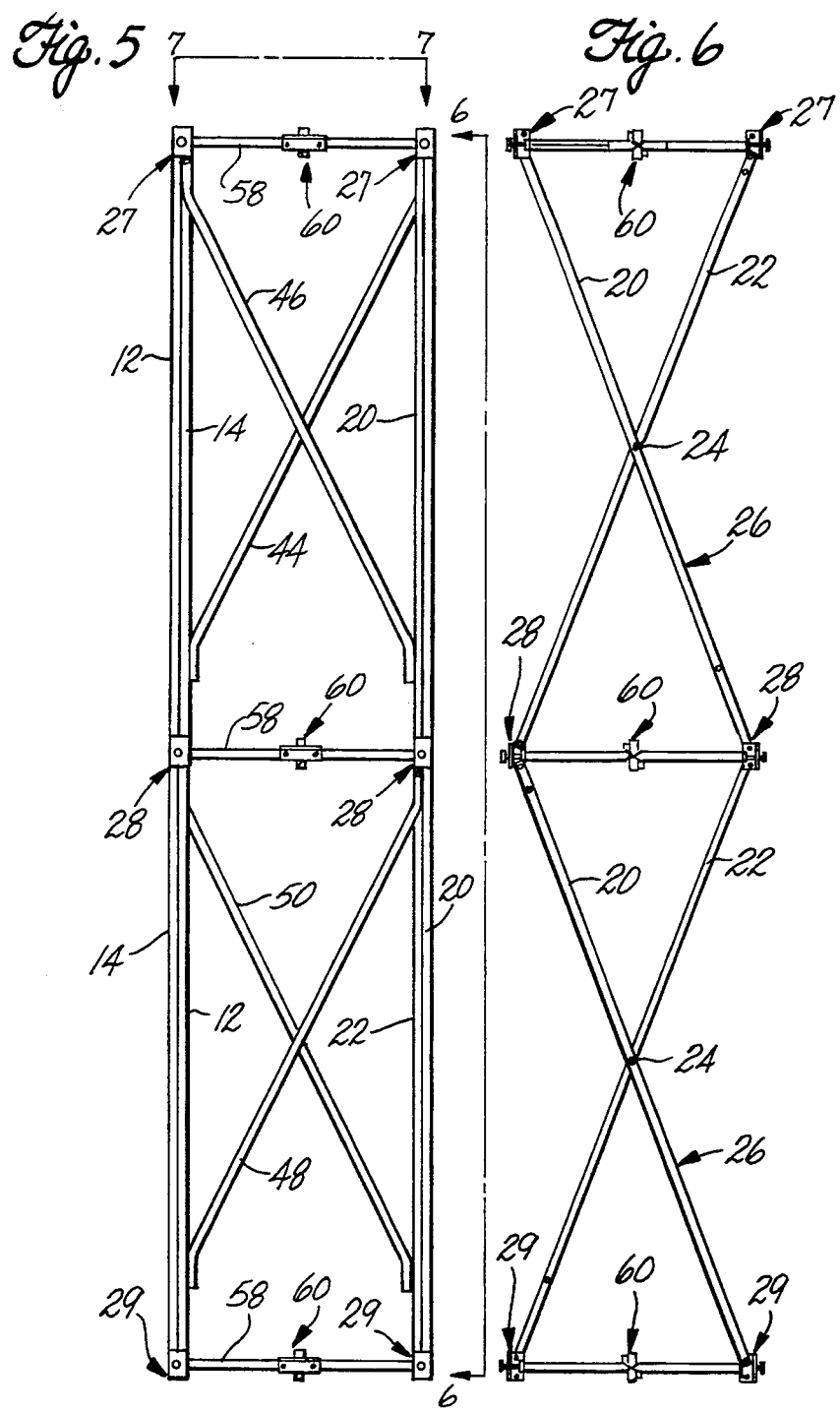

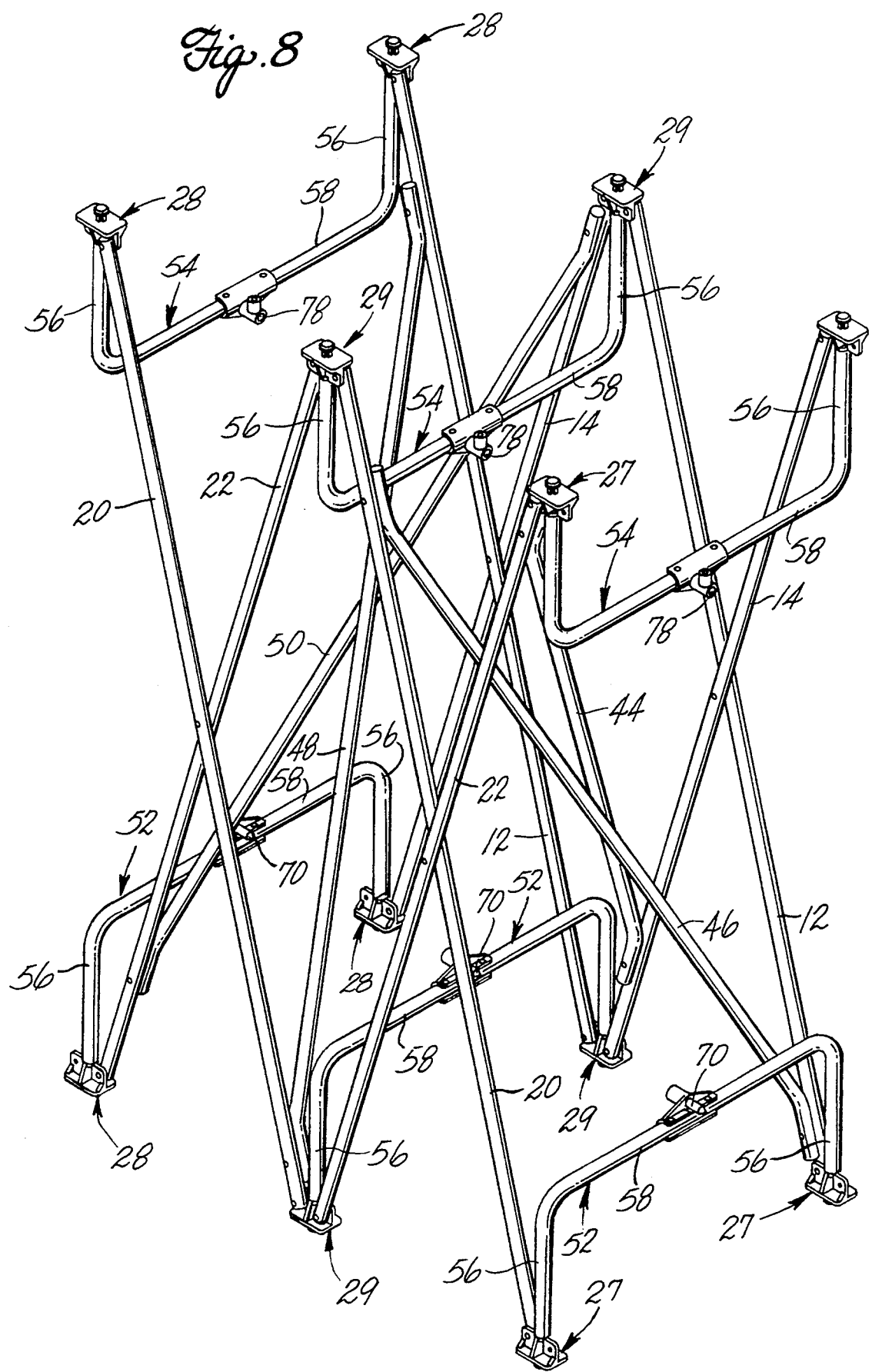

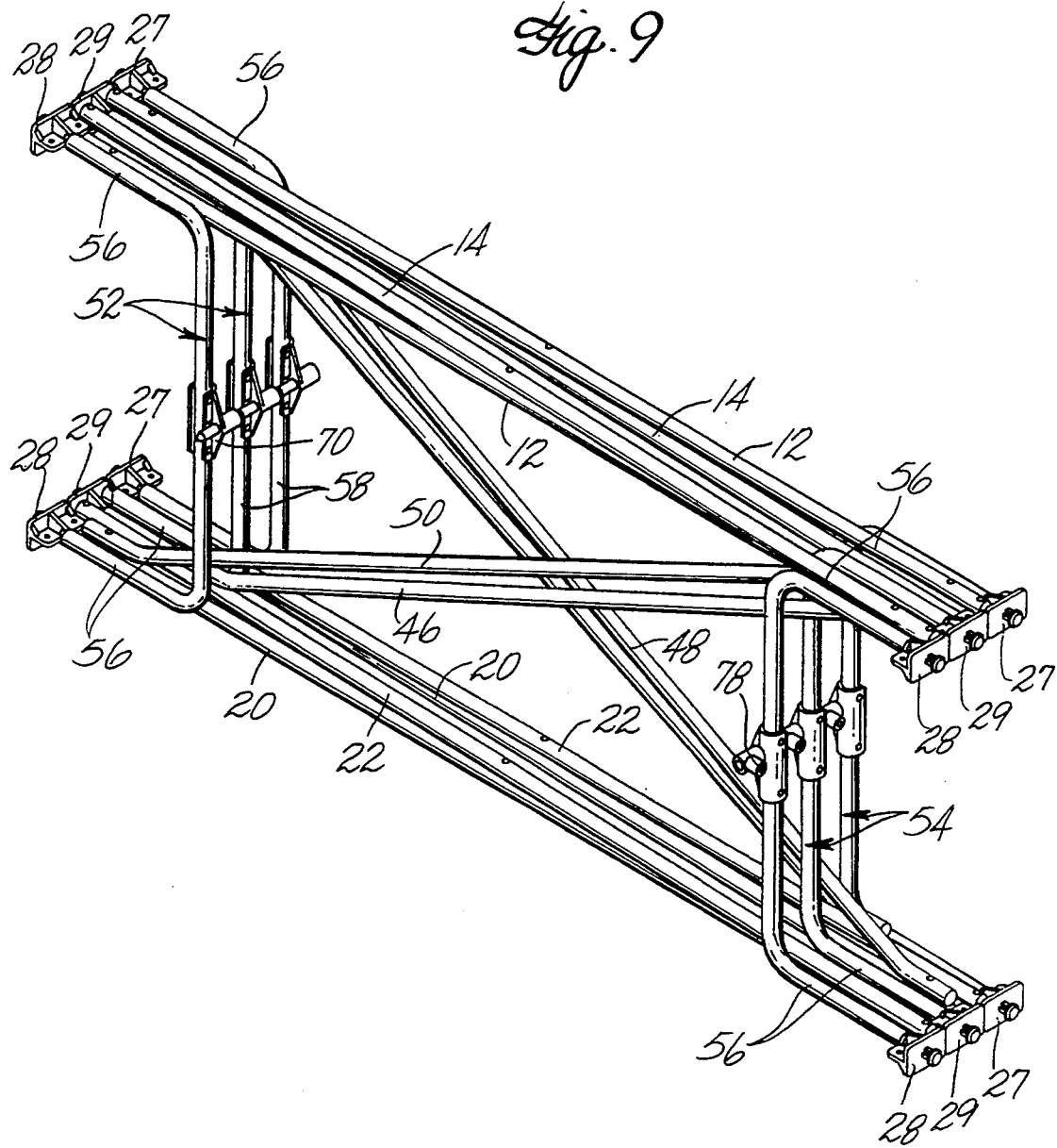

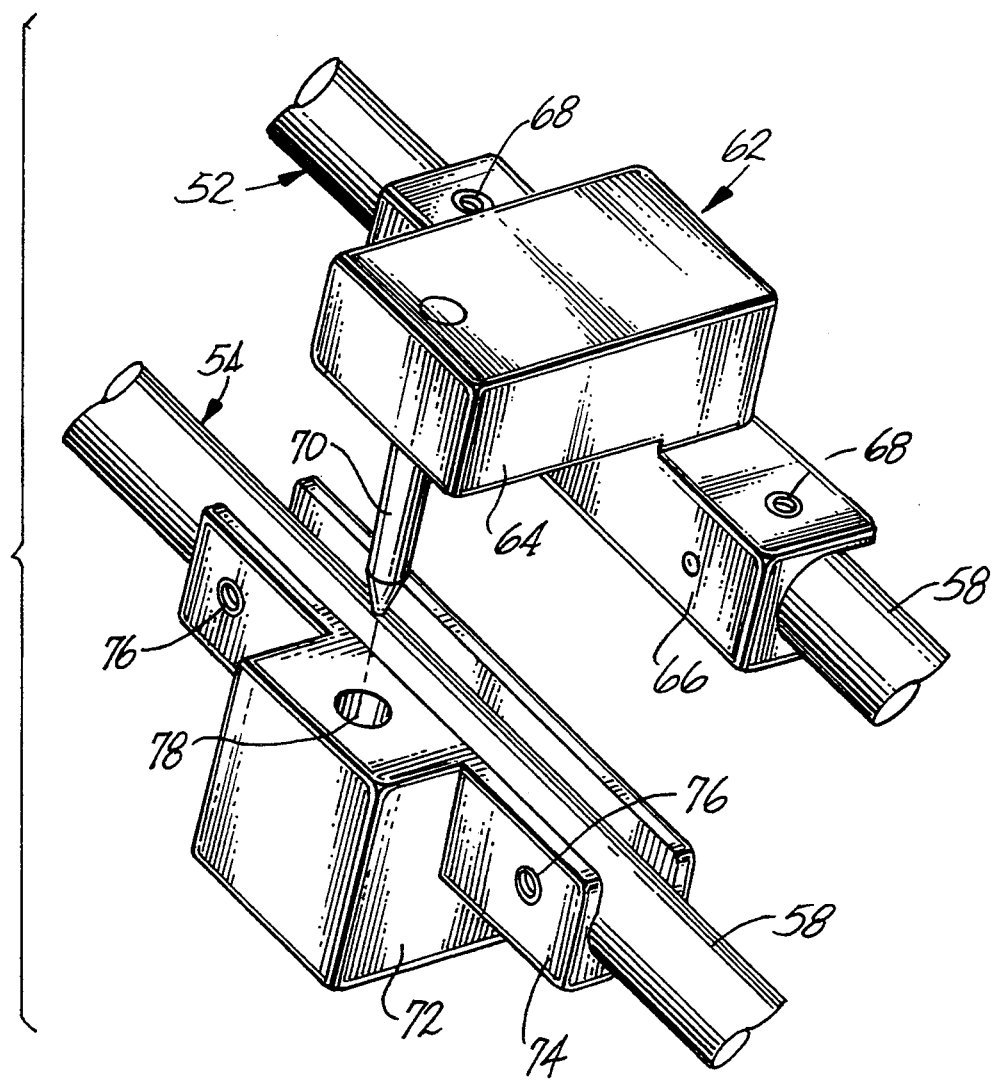

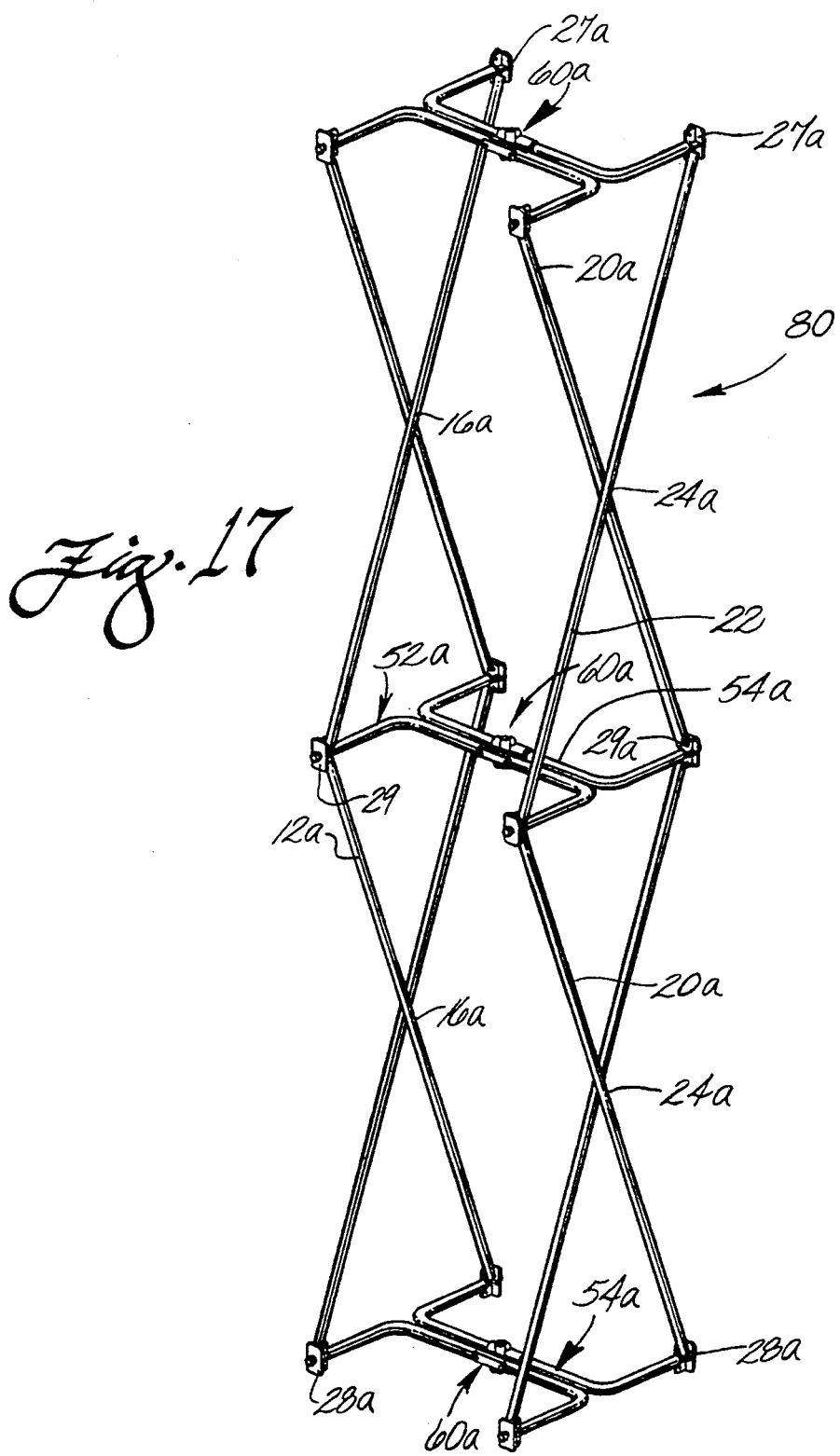

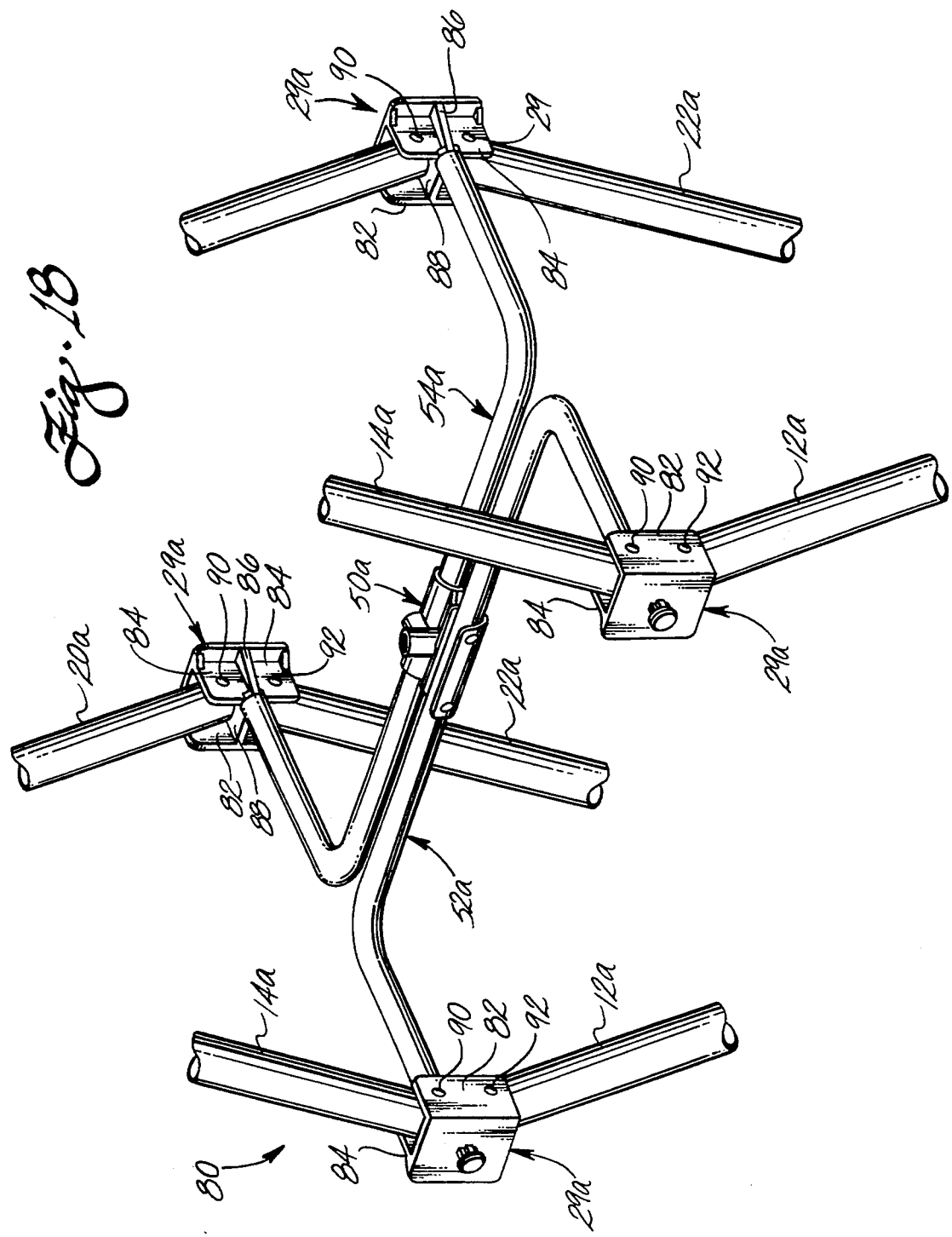

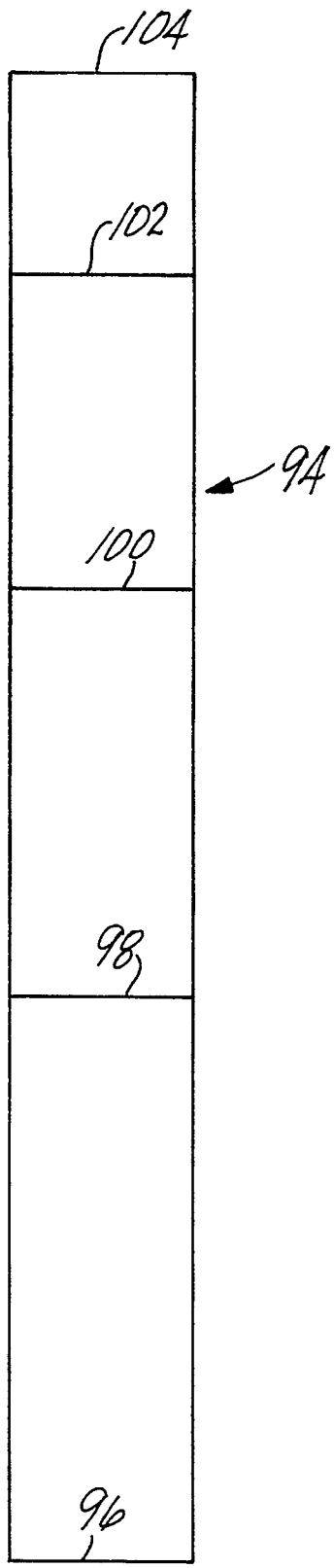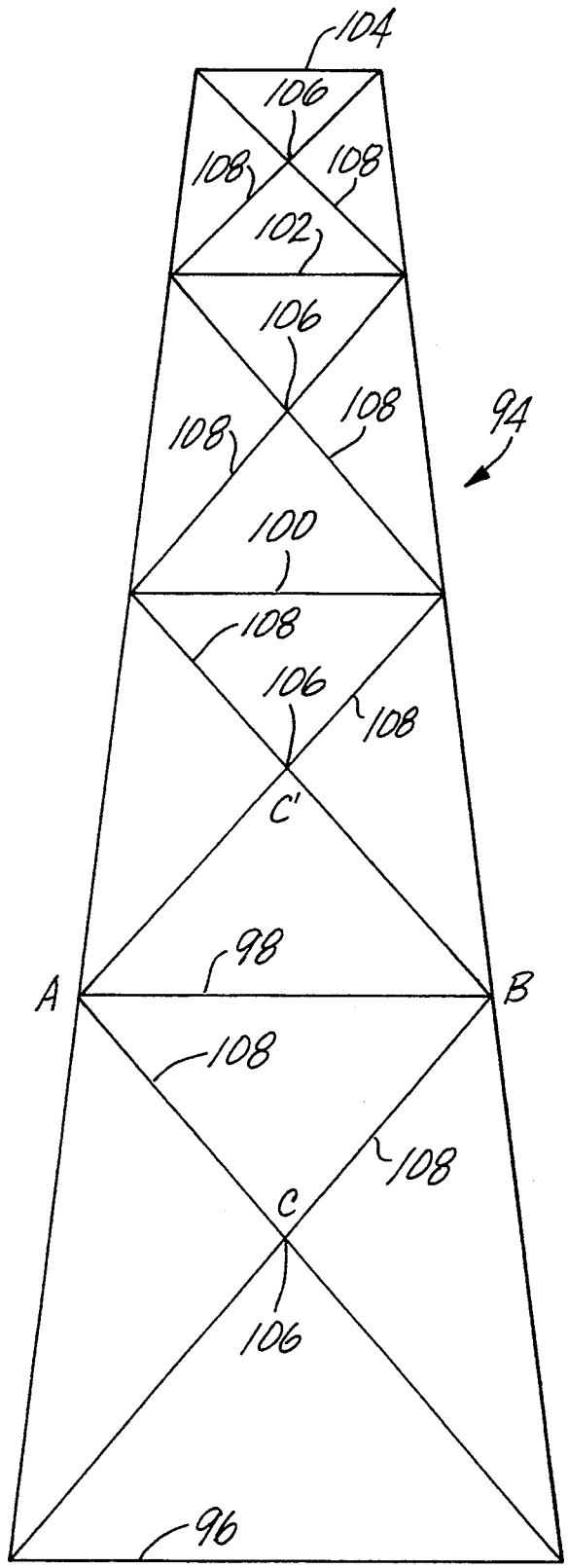

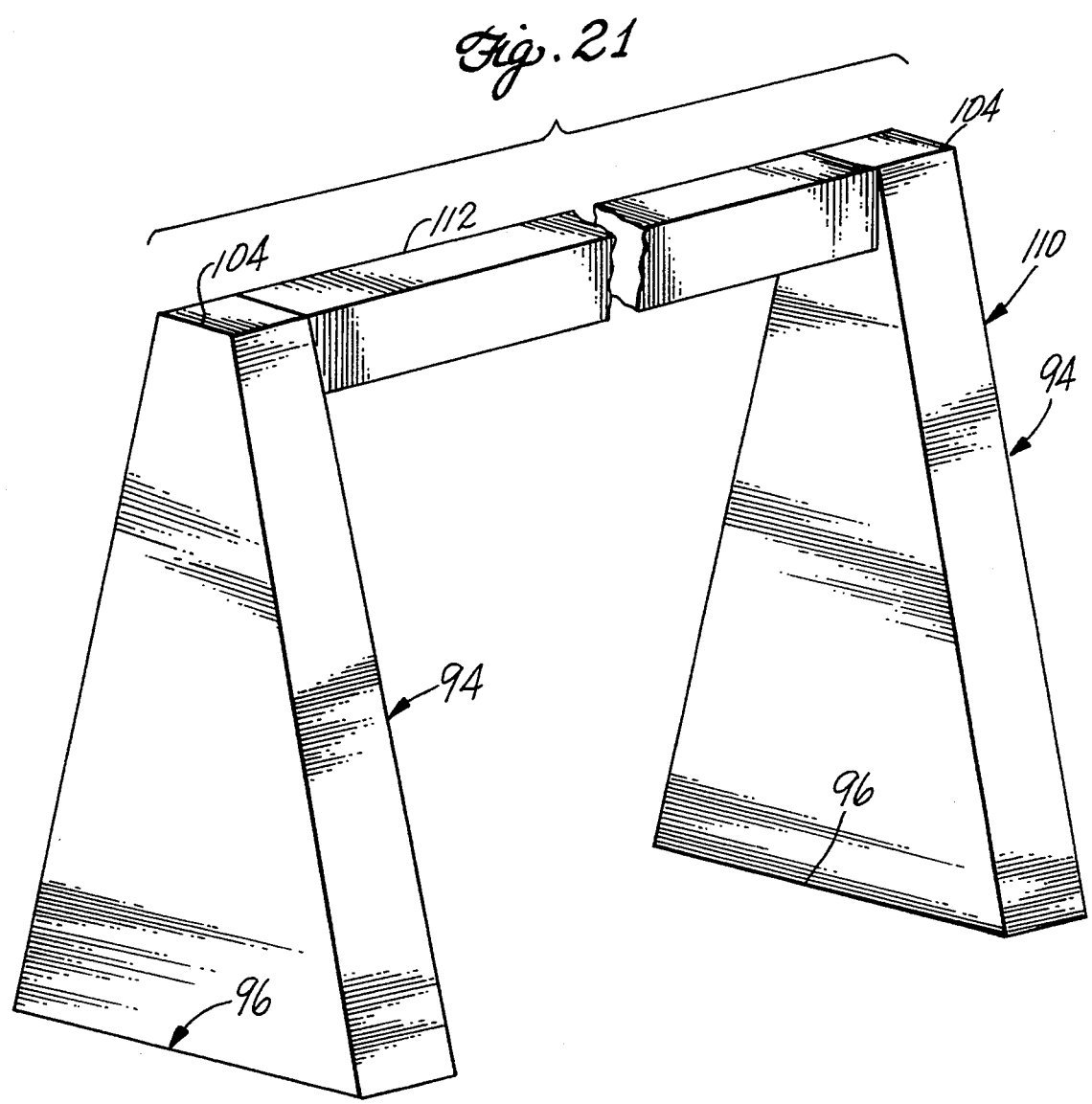

FOLDING DISPLAY FRAME FOR FORMING COLUMN-LIKE STRUCTURES

FIELD OF THE INVENTION

This invention relates to folding display frames, and more particularly, to a foldable display-supporting frame useful in forming long, narrow column or bridge-like structures for folding display frames.

BACKGROUND OF THE INVENTION

Folding display frames are commonly used at trade shows for holding display panels assembled into a temporary display stand. Photomural displays and other graphics, projection screens, product display shelves, and the like are commonly mounted on the portable display stands.

Folding display frames typically comprise a number of rigid frame members pivotally connected together at their ends in a collapsible and portable form. The framework, in its expanded or open form, commonly consists of a grid of horizontal and vertical rod members forming an array of frame-like compartments or cubicles. The frame is carried to the exhibition hall in its collapsed form and is then erected to form the rigid structural framework for the display stand. Display panels which are mounted to the display frame, and other structural members of the supporting frame, also are carried to the trade show in a compact form. The entire folding display system is then assembled into the finished display unit. When the trade show is completed, the display frame is collapsed, and the display system is carried away in its portable form.

In a typical three-dimensional framework, a plurality of rod members are pivotally joined together to permit collapsing of the framework into a compact form in which the rod members lie substantially parallel to each other. Except where the framework is assembled in a substantially permanent structure, the rod members are pivotally joined at their ends to some type of hub, on which the rods can pivot relative to each other as the framework is adjusted between its open, expanded configuration and its closed compact storage configuration. An example of a foldable display frame that opens into an array of pivotally interconnected cubicles is disclosed in my U.S. Pat. No. 4,986,016, which is incorporated herein by this reference. In the display frame shown in that patent, the expanded display frame is collapsed by folding the pivotally joined rod members along two perpendicular axes until all rod members are substantially parallel to each other, with the hubs at the ends of the folded structure being nested closely to one another in a compact form.

One of the objectives in designing folding display frames is to make the structure light in weight and compact in its folded form to enhance ease of transportation and storage when the frame is not in use. At the same time, the framework, when fully expanded into its useful configuration, must be strong and fairly rigid. The framework not only must be strong enough to give adequate support to the display panels and the items mounted on them, but it also must withstand abuse, particularly when being constantly folded and unfolded.

The folding display frame shown in my U.S. Pat. No. 4,986,016 is useful in forming large main display frame structures which span a long side-to-side dimension of say ten to twenty feet and which also extend to a height of about eight to nine feet across the width of the main display frame. This display frame, comprising horizontal rows and vertical columns of interconnected cubicles, provides a stable supporting structure for large display stands.

In recent years, the display frame industry has seen a trend toward the development and use of more creative designs for display stands. This has resulted in use of display frames which are long and of narrow width, to be used as a column (pylon, post, pillar) or a bridge structure in the finished design. Most often these columns are used to support bridges or header frames which attach to other columns or to the main display frame with a span of about five to about sixteen to twenty feet. The column frame in these designs must be capable of handling vertical loads on one or two sides only without undue distortion or flexing.

Display frame columns have been made for many years of rigid, non-folding frameworks, generally of welded truss sections of steel rod and tubing. The frameworks sold under the mark "Interlock Trans-Form8" are an example. Display frame columns made of fixed truss sections fit into carrying cases only after the time-consuming effort of separating them into convenient lengths. The resulting parts are heavy, bulky, and quite expensive. Although they make a strong and attractive column, they do not contain means of attaching panels or art work in addition to the disadvantages of not being conveniently foldable.

It would be desirable to provide a column-like display frame in a conveniently foldable configuration. The previously known folding display frames, such as that shown in my U.S. Pat. No. 4,986,016, do not readily perform well in a column-like configuration. The preferred plan view size of a column is approximately ten or twelve inches square, whereas the plan view dimension of a single cubicle of a standard display frame is either eight or twelve inches in thickness but about twenty-eight to thirty-two inches in height and width. In order to have a small width, to form a column, it is possible to make many small cubicles so that a frame could be made with seven or ten hubs in height to produce a small cross-section. However, this arrangement makes a column that is otherwise of appropriate size too flexible in the left and right side directions. Additional bracing can be added, but the completed assembly would contain many more parts than a single cubicle of a standard display frame and is, therefore, too expensive to produce.

The objectives in designing a folding display frame, which can serve as a useful column structure, include the frame structure being collapsible into a small, transportable size; availability in various lengths to meet customer needs; light in weight while supporting heavy vertical loads, especially eccentric loading, without undue deflection or wobbling from side-to-side; avoiding use of too many structural parts which can make the resulting frame too expensive; resistance to deflection longitudinally, laterally and side-to-side, as well as resistance to torsion loads; and assembling and folding the column-like frame readily without interference of the structural parts or undue time required to connect or disconnect the frame members.

The present invention provides a collapsible display frame structure that can be expanded into a long and narrow column-shaped open frame in a structurally stable configuration. The display frame can be used as bridges, header frames, or act as a vertical column, and the frame is useful in a variety of lengths from about five to about twenty feet. The open frame column structure supports heavy loads and avoids undue deflection longitudinally, laterally, from side-to-side, and also resists torsion loads. It has a small number of parts that make the frame available at a reasonable cost, and the frame is light weight and readily collapsible to a small size. Other advantages are provided.

SUMMARY OF THE INVENTION

Briefly, the present invention provides a collapsible portable framework which is foldable between an expanded open frame configuration for forming a long, narrow column structure for a folding display frame and a compact form for storage in a transportable form. The invention forms collapsible elongated bridge structures for portable display frames, as well as column-like structures. The frame members of the column structure are arranged as one or more frame-like compartments, preferably generally rectangular cubicles, each of which forms a rigid column-like frame structure in its expanded form, with each compartment or cubicle being collapsible into a compact form. In one embodiment where the column structure comprises multiple cubicles, the cubicles are aligned in series and pivotally joined to each other at common ends of the cubicles. Each cubicle has hubs at the corners pivotally joined to the ends of respective rigid rods pivotally interconnected at intermediate points to form parallel scissor members along opposite sides of each cubicle. A rigid box-frame structure is formed at each end of each cubicle by rigid end braces releasably secured to immovably support the ends of the scissor members and their hubs in the expanded configuration of the column-like frame. One or more cross-braces in each cubicle resist lengthwise folding and provide lateral support for the expanded column-like frame. In one embodiment, a pair of rigid cross-braces extend diagonally across the central region of each cubicle, with one cross-brace extending diagonally from a lower front corner to an upper rear corner at the opposite side of the cubicle, and the other cross-brace extending diagonally from an upper front corner to a rear lower corner at the opposite side of the cubicle. Other cross-brace arrangements can be used. In a further embodiment, the cross-braces can be omitted. In a preferred embodiment, the ends of each diagonal cross-brace are rigidly affixed to end portions of the scissor members adjacent their respective hubs. Alternatively, the ends of each cross-brace can be affixed to the hubs themselves. Disconnection of the end braces releases the rigid support provided by the box-frame structure at the ends of each cubicle and thereby permits the frame to be collapsed along a single axis by folding the scissor members so the cubicles are collapsed along the length of the column. The display frame structure thereby folds into a compact form in which the scissor members on each side of the cubicles are folded generally parallel to each other, with adjacent cubicles in the column being folded to a side-by-side collapsed form.

In one form of the invention, the end braces comprise a pair of rigid U-frames pivotally affixed to the ends of a corresponding pair of scissor members. The U-frames are movable adjacent to one another into the plane defined by each end of the cubicle. A releasable connection affixed to adjacent portions of the U-frames interlocks to hold the U-frames in a rigid position forming the supporting box-frame structure at the ends of each cubicle. The U-frame connections are releasable to pivot the U-frames away from one another to enable folding of the scissor members into the compact form of the column-like frame structure.

The U-frames are one example of suitable end braces. In an alternate form of the invention, the end braces can comprise rigid rods releasably fastened between the ends of corresponding pairs of scissor members to form the rigid box-frame structures at the ends of each cubicle.

The expanded configuration of the column-like frame structure has the width of one cubicle, and when multiple cubicles are used, the cubicles are folded along the length of the column to the compact form having the width of one cubicle. Folding to this compact configuration can be done easily and is very convenient for transporting the collapsed frame. The scissor members, the end braces, and the diagonal cross-braces combine in a rigid framework to resist undue deflections of the column structure longitudinally, laterally, from side-to-side, and in torsion. The cross-braces and end braces are arranged in a combination that allows readily folding the column-like open frame simply by disconnecting the end braces and folding the cubicles into a side-by-side form. This is done without undue interference from the structural members or requiring further time-consuming disconnection of structural parts. The unique combination of scissor members, end-braces and diagonal braces, with the hubs pivotally connecting adjoining cubicles made from these component parts, produces a rigid, light weight, stable column-like frame structure that can be manufactured at a reasonable cost.

These and other advantages provided by this invention will be more fully described in the following detailed description and the accompanying drawings.

BRIEF DESCRIPTION OF THE DRAWINGS

FIG. 1 is a perspective view showing one embodiment of a two-cubicle foldable display frame of this invention in an open, expanded position.

FIG. 2 is an enlarged perspective view taken within the circle 2 of FIG. 1.

FIG. 3 is an enlarged perspective view taken within the circle 3 of FIG. 1.

FIG. 4 is an enlarged perspective view taken within the circle 4 of FIG. 1.

FIG. 5 is a side elevation view of the expanded open frame.

FIG. 6 is a front elevation view taken on line 6—6 of FIG. 5.

FIG. 7 is a top view taken on line 7—7 of FIG. 5.

FIG. 8 is a perspective view showing the framework folded to an intermediate position between the open expanded position and a compact closed position.

FIG. 9 is a perspective view of the frame in its compact folded configuration.

FIG. 10 is a perspective view showing means for releasably interconnecting end-brace members of the display frame.

FIG. 17 a perspective view showing an alternative embodiment of a two-cubicle foldable display frame in which the diagonal cross-braces are omitted.

FIG. 18 is an enlarged fragmentary perspective view showing components of the frame of FIG. 17.

FIG. 19 is a schematic front elevational view showing a multi-compartment foldable display frame with tapered sides.

FIG. 20 is a side elevation view of the tapered frame shown in FIG. 9.

FIG. 21 is a fragmentary schematic perspective view showing truncated triangular free-standing column-like frames used with a bridge member extending between the triangular columns.

DETAILED DESCRIPTION

Figure 11:
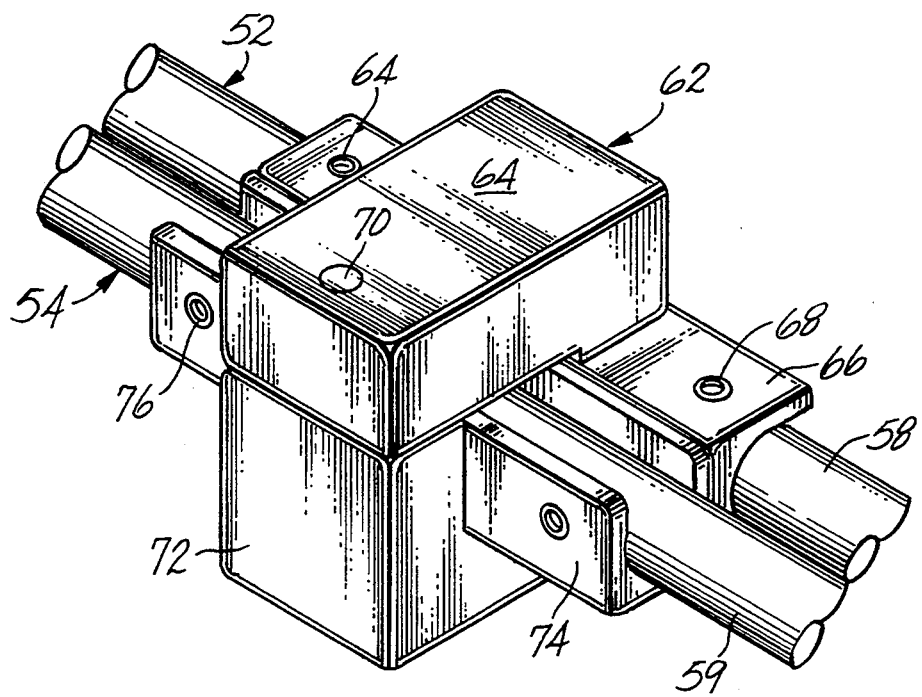
FIG. 11 is a perspective view similar to FIG. 10 showing the end-brace members in a connected position.
Figure 12:
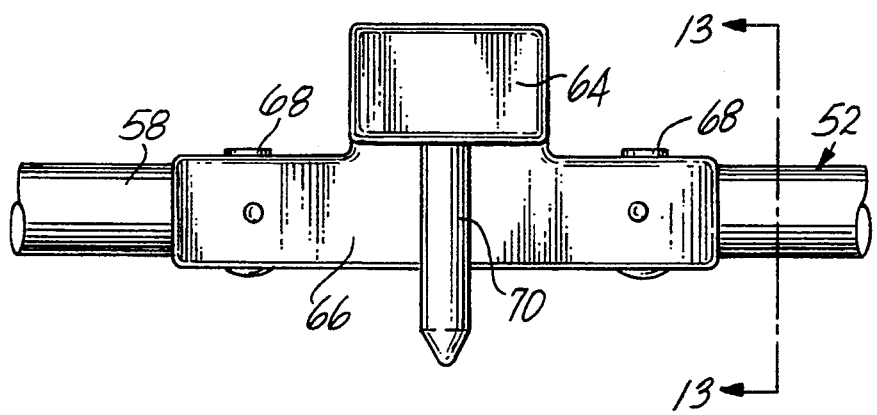
FIG. 12 is a front elevation view showing an end-frame connector pin.
Figure 13:
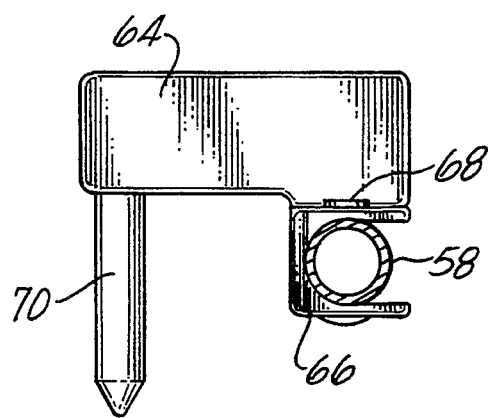
FIG. 13 is a side elevation view, partly in cross-section, taken on line 13—13 of FIG. 12.
Figure 14:
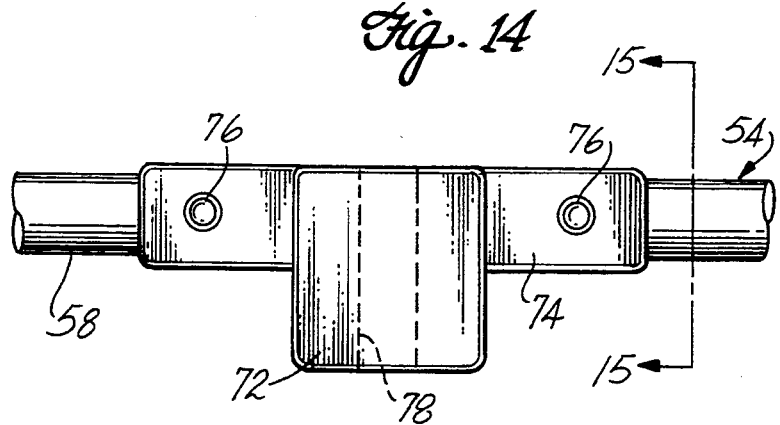
FIG. 14 is a front elevation view showing an end-frame connector socket.
Figure 15:
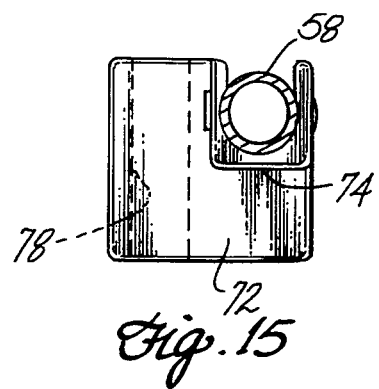
FIG. 15 is a side elevation view, partly in cross-section, taken on line 15—15 of FIG. 14.

FIG. 1 illustrates a two-cubicle folding display frame 10 in its open, expanded configuration. The framework is constructed from multiple rods or frame members in the form of thin-walled rigid metal tubes joined together to pivot between the expanded configuration of the frame and a folded compact configuration shown in FIG. 9. In the expanded configuration shown in FIG. 1, the frame forms a long, narrow column-like structure for use in forming vertical columns (pillars, posts, pylons) or horizontal bridge structures as components of different display frame designs. The display frame of this invention is characterized by providing such long, narrow frame-like structures in a construction which avoids wobbling when in its vertical orientation, while also able to hold heavy loads, including eccentric loading, in either of its vertical or horizontal orientations. This stability of the open, expanded frame is produced by the framework's ability to resist undue deflection longitudinally, laterally from side-to-side or front-to-back, and while also resisting torsional loading when twisted in either direction about its longitudinal axis. Other improvements will be more apparent from the description to follow.

Referring to the FIG. 1 perspective view and the enlarged views shown in FIGS. 2, 3, and 4, the display frame comprises a series of frame-like compartments of polygon form which, in the illustrated embodiment, are formed as generally rectangular cubicles pivotally joined end-to-end along the open framework. In the illustrated embodiment two generally rectangular cubicles are joined end-to-end. The frame can comprise one cubicle although typically it is constructed with two or more cubicles aligned end-to-end and joined pivotally along the length of the column. The column width is equal to the width of one cubicle only.

Rectangular cubicles are a preferred embodiment, but other compartments of different polygon configurations can be used. One such embodiment, illustrated in FIGS. 20 and 21, includes compartments with tapered sides.

Each rectangular cubicle in the vertically oriented frame shown in FIG. 1 has six sides, referred to herein as left and right sides, front and rear sides, and upper and lower ends. Each cubicle also has four corners at its upper end symmetrically aligned with four corners at its lower end. This arrangement of the vertical column form of the frame is for convenience of description; the frame is also easily used in its horizontal orientation. In the illustrated embodiment, the cubicles are each about ten to twelve inches wide (from left to right and from front to back) and the height of each cubicle is about 28 to 32 inches. The left and right sides of each cubicle are constructed of corresponding rod members pivotally joined to pivot about an intermediate axis in a scissor-like fashion. Thus, the left side of each cubicle has a pair of rigid, elongated rod members 12 and 14 pivotally joined together by a transverse pivot pin 16 to form a left side scissor member 18. The right side of each cubicle has a pair of rigid, elongated rod members 20 and 22 pivotally joined by a transverse pivot pin 24 to form a right side scissor member 26. The left and right scissor members are of identical height, they extend parallel to one another along the left and right sides of each cubicle, and their pivot axes are aligned collinearly substantially along the center of the cubicle. Alternatively, the pivot pins 16 and 24 can be offset, in which case the column-like structure can form a curved arch instead of a straight column.

The scissor members 18 and 26 allow the pairs of rod members to swivel with respect to each other in a scissors-like fashion. The arrangement of scissor members along the same opposite sides (left and right sides) of all cubicles joined along the length of the column allows the frame to be expanded into the upright column shape shown in FIG. 1 or readily folded, in one direction along the length of the column, into the compact configuration shown in FIG. 9.

The ends of the scissor members 18 and 26 are pivotally joined to corresponding hubs located at the four corners of each end of each cubicle. The pivotal connection of the rod members to the hubs provides rotation of each end of a rod relative to its corresponding hub about a single axis of rotation through the hub. In the illustrated embodiment of FIG. 1, which shows an upper cubicle pivotally joined to a lower cubicle, there are four upper hubs 27 at the four corners of the rectangular upper end of the upper cubicle, and four lower hubs 28 at the four corners of the rectangular lower end of the lower cubicle; the upper and lower cubicles share common intermediate hubs 29 at the upper end of the lower cubicle and the lower end of the upper cubicle.

The hubs are all identical in construction and are best illustrated in the enlarged views of FIGS. 2 through 4. Each hub has a rectangular shaped base plate 30 with fixed flanges projecting generally perpendicularly from a common face of the base plate. The fixed flanges are used as a supporting base to which corresponding rod members are pivotally connected. The hubs preferably include a pair of vertical flanges 31 having corresponding fixed bearing surfaces lying substantially along a vertical axis passing essentially through the central axis of the hub. The flanges 31 are aligned on opposite sides of the central axis through the hub. Each hub is preferably molded of a suitable plastic material, but it also can be die cast or otherwise formed of a light weight metal. The hub can be formed with a knob or flanged pin 32 projecting from the face of the base plate 30 opposite from the flanges. The knob is used to mount various auxiliary devices to the framework such as folding channel bars, disclosed in my U.S. Pat. No. 4,986,016, for the purpose of attaching display panels or other display devices or supports to the front of the expanded frame. The flanges are integrally molded with an enlarged central region of the hub which is, in turn, integrally molded with the base plate 30. A large hole extends through the enlarged central region of the hub along the central axis of the hub. The hole provides a means for supporting rigid end frame members for bracing opposite ends of the cubicles as described in more detail below.

The embodiment of the frame shown in FIGS. 1 through 9 illustrates one arrangement of means for pivotally attaching the ends of the scissor members to the hubs. Referring to FIG. 2, the hubs 27 at the corners of the rectangular upper end of the upper cubicle provide a means for pivotal attachment of the left and right side scissor members. On the left side of the upper cubicle, the end of the scissor member 12 is pivotally secured to the outside of a lower vertical flange 31 of the hub 27 at a front corner, and the upper end of the scissor member 14 is pivotally attached to the inside of a lower vertical flange 31 on the hub 27 at the rear corner. On the right side of the upper cubicle, the upper end of the scissor member 20 is pivotally attached to the inside of a lower vertical flange 31 of a hub 27 at a front corner, and the upper end of the scissor member 22 is pivotally attached to the outside of the lower vertical flange 31 on the hub 27 at the rear corner of the upper cubicle.

Referring to FIG. 3, the lower ends of the scissor members in the upper cubicle are attached to corresponding sides of upper vertical flanges 31 on the hubs 29. On the left side of the lower cubicle, the upper end of the scissor member 12 is pivotally secured to the inside of a lower vertical flange of the hub 27 at the front corner of the cubicle, and the scissor member 14 is pivotally secured to the outside of the lower vertical flange of the hub 29 at the rear corner of the cubicle. On the right side of the lower cubicle, the scissor member 20 is pivotally secured to the outside of the lower vertical flange of the hub 29 at the front corner of the lower cubicle, and the scissor member 22 is pivotally secured to the inside of the lower vertical flange of the hub 29 at the rear corner of the cubicle.

FIG. 4 shows that the lower ends of the scissor members for the lower cubicle are pivotally secured to the same corresponding sides of the upper vertical flanges 31 of the hubs 28 at the lower corners of the lower cubicle.

A pair of diagonal cross-braces extend across the inside of each cubicle to rigidly support the scissor members 18 and 26 against lateral deflection. In the upper cubicle, the diagonal cross-brace members include a first cross-brace 44 which extends from a lower front corner of the upper cubicle, across the central region of the cubicle, to an upper rear corner of the cubicle. A second cross-brace 46 extends diagonally from a lower right rear corner of the upper cubicle, across the central region of the cubicle, to an upper left front corner of the cubicle. The ends of the cross-braces have angular bends which lie flat against the insides of the scissor members. The angular ends of the cross-braces are rigidly affixed to the scissor members by corresponding rivets. The first and second diagonal cross-brace members 44 and 46 bypass one another in the central region of the upper cubicle without being connected to each other.

Preferably, the upper cross-brace members 44 and 46 are rigid metal tubular members of fixed length, and although other configurations could be used, the preferred construction is to rigidly affix the ends of the diagonal members to corresponding ends of the scissor members spaced a short distance from their corresponding hubs.

In the illustrated embodiment, the cross-braces in the lower cubicle extend in different diagonal directions with respect to the cross-braces in the adjacent upper cubicle. Thus, in the illustrated embodiment, in the lower cubicle a first lower cross-brace 48 has its lower end rigidly affixed to the lower end of the left side scissor member 12 and its upper end rigidly affixed to the upper end of the right side scissor member 20. A second lower diagonal cross-brace 50 has its lower end rigidly affixed to the lower end of the right side scissor member 22 and its upper end rigidly affixed to the upper end of the left side scissor member 14.

The diagonal cross-brace members rigidly support the scissor members 18 and 26 on the left and right sides and on the front and rear sides of the cubicles so as to resist deflection of either scissor member either in a lateral direction toward or away from one another or in directions in the planes of the scissor members. In addition, the diagonal cross-braces resist torsion loads in either direction about the long axis of each cubicle.

The cross-brace members each extend from the front side to a rear side of the cubicle and from a left to a right side of the cubicle. The ends of the cross-brace members are preferably affixed rigidly to the ends of the scissor members, as shown in the drawings; alteratively, they can be affixed to portions of the hubs to which their corresponding scissor member ends are fastened.

In a further alternative form of the invention, less than two diagonal cross-brace members can be used; for example, in certain instances sufficient resistance to deflection and torsion can be provided by the use of one diagonal cross-brace.

The upper and lower ends of each cubicle are rigidly supported by end-frame members for rigidly maintaining the hubs at the corners of the cubicles in fixed spaced-apart positions, resisting relative movement or "parallelograming" of the open frame. In the illustrated embodiment, each rigid end-brace system preferably comprises a pair of U-shaped end braces 52 and 54 in which opposite legs 56 of each U are rigidly secured to corresponding hubs. In the preferred arrangement, the ends of the legs of each U-frame are rigidly affixed to the enlarged central region of the hub on the central axis of the hub. Each U-frame also has a corresponding base member 58 extending rigidly between the legs of the U. The U-frames are arranged so that the legs of one U-frame are affixed to a corresponding pair of hubs on a front side of the open frame. The legs of the other U-frame at the same end of the cubicle are rigidly affixed to the hubs at the rear side of the cubicle. Since the hubs pivot relative to the ends of the scissor members, the U-frames are able to pivot with the hubs relative to the ends of the scissor members. Thus, the U-frames at each end of the cubicle can be folded generally into the rectangular plane defined by the end of each cubicle. Further, the U-frames are configured and arranged so that the base members 58 of each U-frame can lie adjacent to one another generally along a central axis through the plane defined by the end of the cubicle when the U-frames are folded to the expanded position of the framework shown in FIG. 1. The adjacent base members 58 of the cooperating U-frames are then locked to one another to form the supporting positions of the end frame members at each end of each cubicle, which locks the column-like frame 10 in its stable open, expanded position.

The base members 58 of the adjoining U-frames 52 and 54 are preferably secured together in their end-bracing position by a cooperating pin and socket arrangement in which a rigid pin is affixed to a central portion of the base member 58 of one U-frame and is releasably engaged with a socket or receptacle in a bearing member affixed to the center of a base portion of the other U-frame at the same end of each cubicle.

The framework shown in FIGS. 1 through 9 illustrates one embodiment of a cooperating pin and socket arrangement 60, while the enlarged views of FIGS. 10 through 15 show a somewhat different configuration of a pin and socket connector assembly 62. Both embodiments operate on the same principle.

Referring to the enlarged views of FIGS. 10 to 15, a pin and socket connector system 62 for the cooperating U-frames 52 and 54 comprises a molded plastic pin support block 64 having an elongated channel shaped connector 66 that holds the pin block to the base 58 of the U-frame. The channel shaped connector 66 is generally C-shaped in cross-section and fits around the tubular metal rod that forms the base 58 of the U-frame. Rivets 68 on opposite sides of the connector channel rigidly affix the channel to the base 58 of the U-frame. The pin support also includes the generally rectangularly-shaped pin holding block 64 that is integrally molded with the channel-shaped connector 66. The pin holding block 64 projects away from the base 58 of the U-frame to a position in which it can overlie the base 58 of the cooperating U-frame on the other side of the cubicle. An elongated rigid metal pin 70 is rigidly affixed to and projects downwardly from the underside of the pin holding block 64. A similar pin 70 is shown on the U-frames 52 in the embodiment of FIGS. 1-9.

The cooperating receptacle portion of the pin and socket connector comprises a receptacle block 72 having an elongated channel-shaped connector 74 rigidly affixed to the base 58 of the other U-frame by rivets 76 on opposite sides of the receptacle block. When the two U-frames are rotated into the same plane so that the bases 58 of the two U-frames lie adjacent to one another, the pin block 64 rotates the pin 70 toward the receptacle block 72 so the pin can be frictionally and releasably inserted into an opening or socket 78 extending through the receptacle block 72. A similar socket 78 is shown on the U-frames 54 in the embodiment of FIGS. 1-9. When the pin 70 is inserted into the socket 78 and the two U-frames are rotated into the plane at the end of the cubicle, the receptacle block and pin holding block can be pressed toward one another and into a rigid unitary connection as illustrated in FIG. 11. When the two U-frames are connected to one another by this pin and socket connection, the two U-frames are rigidly locked to one another and cooperate to form a rigid box-frame at each end of each cubicle. The resulting box-frame holds the hubs at the four corners of each cubicle in rigid spaced-apart positions, resisting movement toward or away from one another, and resisting deflection and torsional loading at the ends of the cubicles. The U-shaped end frame members 52 and 54 are easily disconnected from the end-bracing position by simply rotating the U-frames and hubs in opposite directions away from one another to disengage the pin from the socket.

In an alternate form of the invention straight rigid rods can be used to form end braces at each end of the cubicle in place of a U-frame. The rigid rods can extend rigidly between hubs or cross-braces on front and rear sides of the cubicles and separate rigid rods can releasably connect hubs or cross-braces on opposite left and right sides of the cubicle.

In use, the folding display frame is opened to its expanded position shown in FIG. 1 by spreading apart the top and bottom ends of the frame, which allows the scissor members at the sides of the cubicles to pivot about their axes. This expands the height (or length) of the frame by expanding apart each cubicle to the position where the U-frames at the opposite ends of the cubicles can be locked together to hold the frame in the upright rigid display-supporting position shown in FIG. 1. Each pair of U-frames is locked by rotating the frames (about the pivot points through the ends of the scissor members) so that the pin on one U-frame is above the socket on the other U-frame. The pin is inserted in the socket, and the two connector blocks holding the pin and socket are pressed together as a rigid unit which locks the U-frames in a rigid position in the plane of the rectangular end of each cubicle. When all U-frames at the ends of all cubicles in the display frame are locked together, the frame is in its stable display supporting position.

In its open, expanded position the interconnected U-frames form rigid box-frame bracing structures at the ends of the cubicles. This holds the ends of the scissor members 18 and 26 rigidly spaced apart at the corners of the cubicles. The rigid scissor members are therefore able to provide lengthwise rigidity resisting lengthwise loads on the frame. They also provide good resistance to loads acting from front to back (or vice versa) on the frame. The diagonal cross-brace members, which are rigidly affixed to the scissor members at opposite sides and at opposite ends of each cubicle, provide rigidity from left to right acting on the frame by their rigid support of the spacing between the scissor members on opposite sides of each cubicle. In addition, the rigid cross-members cooperate with the other structural members of the cubicles to resist torsional loading in either direction about the axis of the frame.

When folding the frame to its collapsed, compact form, the U-frames are unlatched and are pivoted generally into the plane of the adjacent scissor members. Each U-frame is rigidly secured to a pair of hubs at the ends of scissor members at opposite sides of the frame, and the hubs and U-frames pivot together into the plane of the scissor members to which the U-frame is pivotally attached. The frame in its disconnected position is then able to fold by spreading apart the sets of hubs on opposite sides of the frame, which pivots the scissor members about their axes, so that each pair of scissor members on opposite sides of each cubicle can be folded about their respective axes toward a position in which the scissor members of each pair are nearly parallel to one another. FIG. 8 shows an intermediate folded position of the framework in which the scissor members are being pivoted toward one another until the frame is folded to the compact form shown in FIG. 9. The frame folds in only one direction, along the length of the column, with the scissor members providing the means for folding each cubicle to a compact flat form. The diagonal cross-braces fold with the scissor members and do not interfere with the folding process. Since the frame-like column has the width of one cubicle, the width of the cubicle remains fixed in the folded configuration of the frame by the rigid U-frame members, as the diagonal cross-braces maintain the scissor members at opposite sides of the frame in their spaced-apart positions, one cubicle width apart.

Thus, the column-like frame can be readily assembled by expanding it to its open position and simply locking the U-frame members together; or it can be folded to a compact form by simply unlatching the U-frames and folding the frame in a single direction to its compact form. No other structural members need to be connected or disconnected. The improved display framework of this invention can be made very compact and light in weight. The folding framework folds into its compact size while maintaining rigidity and strength of the overall framework.

In one embodiment, the folding framework uses 1⅜ inch hubs with tubular metal rods of 7/16 inch outside diameter and a 0.05 inch wall thickness, and yet the framework can fold up into the compact size shown in FIG. 9 in which the hubs are nested together adjacent to one another along each side of the frame in a small compact package.

The frame retains overall strength, rigidity and stability of the display stand and can be used not only in the vertical column-like orientation shown in FIG. 1, but can also be used as a horizontal bridge member as well.

In addition, the U-frame members have the advantage of not obscuring critical areas at the sides of the cubicles. This eliminates shadows being formed along the front of two opposite sides of the display structure to allow back lighting of a continuous transparency mounted to the finished column structure.

As a further improvement, the construction of the column-like frame structure of this invention makes it possible to vary the dimensions of the finished column-like structure and any of the three orthogonal dimensions of the finished column, i.e., the scissor members, U-frame members and diagonal cross-braces can simply be adjusted in length during the manufacturing process to vary either the length or height of the frame, its width, and/or the depth of the frame. The number of cubicles also can be varied to control the length of the column structure.

Figure 16:
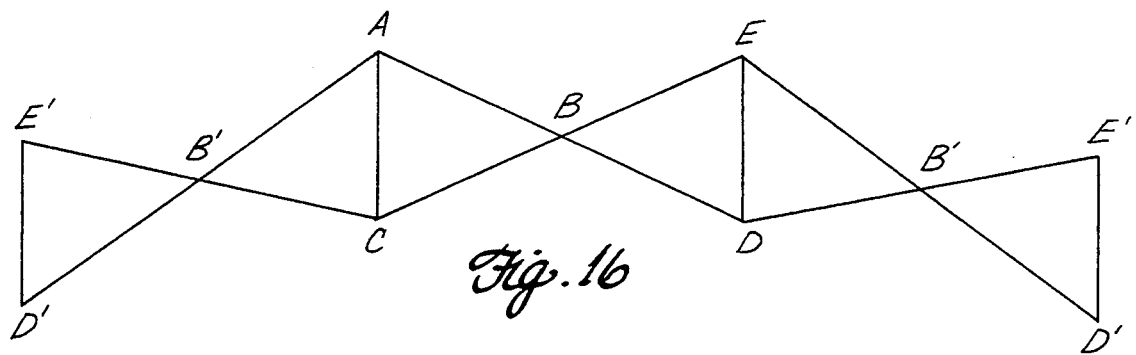
FIG. 16 is a schematic side elevation view showing and arch-shaped column.

The invention has been described above with respect to column-like folding display frames which form essentially straight columns. However, curved arch-shaped columns also can be formed from the collapsible framework of this invention. FIG. 16 schematically illustrates one example of an arched-shaped column comprised of three series-connected cubicles. The scissor members at the sides of the center cubicle are essentially identical in length; but the scissor members at the sides of the cubicles at opposite ends of the arch are of different length. In the illustrated embodiment the length of triangle ABC is equal to the length of triangle AB'C, but tubes AD' and ED' are longer that tubes CE' and DE', respectively. The tubes AD' and ED' are of the same length, and the tubes CE' and DE' are also of the same length. This embodiment also includes the diagonal cross-braces arranged in a manner described above with respect to the straight column structures. The finished arch-shaped folding display frame forms an easily collapsible or expandable arch-shaped column structure.

Alternatively, the series-connected cubicle-form column structure of this invention can be formed as an arch by offsetting the pivot points of the scissor members on one side of the frame structure with respect to the pivot points of the scissor members on the opposite side of the frame structure. In this embodiment, in which a three cubicle arch is formed, the pivot points for the center cubicle would be aligned generally at the centers of the scissor members on opposite sides of the center cubicle.

FIGS. 17 and 18 illustrate a further alternative form of the invention in which the multi-cubicle column-form structure is formed without diagonal cross members. In this form of the invention, a two-cubicle column-like frame structure shown at 80 has scissor members at the sides pivotally connected to hubs to which the U-frame members 52a and 54a are connected. The U-shaped end frame members are interlocked in a manner similarly described previously by the use of the interlocking devices 60a. In this form of the invention, the hubs 27a, 28a, and 29a at the different levels of the column structure are made of a sturdy configuration shown best in FIG. 18. Each hub has a vertical side member 82, a vertical rib 84 spaced from and parallel to the side member 82, horizontal ribs 86 reinforcing the vertical ribs 84, and a horizontal rib 88 acting as a reinforcement between the vertical ribs 82 and 84. Upper pivot pins 90 in the form of larger rivets pivotally join the bottom ends of the scissor members to the upper portions of the hubs to strongly capture the ends of the tubes between flanges on three sides of the scissor member ends. Similarly, lower pivot pins 92 pivotally join upper ends of the scissor members to lower portions of the hubs so that flanges on three sides of the tubes strongly capture the upper ends of the scissor members. Since the ends of the scissor members are very strongly captured by the sturdy reinforced hub members, the hubs and the captured ends of the tubes do not deflect significantly under loads.

Futher, the tubes from which the scissor members are made are of large diameter (at least ¾ of an inch in diameter) so that the scissor members themselves do not deflect appreciably along their length. This combination of capturing the ends of the tubes with a strong hub and large rivet and using a very rigid tube can eliminate the need for diagonals, at least in a vertical column configuration. In a bridge configuration, depending upon the length, some amount of lateral deflection can be prevented by the use of one or more diagonal cross-braces.

FIGS. 19 through 21 illustrate an alternative embodiment of the invention in which a column-shaped display frame structure 94 is formed with compartments which are not cubicles, but in which the framework forming the configuration of each compartment is shaped as a truncated triangle. In this form of the invention, the tapered column structure has the larger base of each truncated triangle at the bottom of the compartment and the smaller end of each truncated triangle at the top of each compartment. The top and bottom frame members of each compartment are parallel, and the sides of each compartment taper narrower from the bottom to the top. As shown in the drawings, the column structure tapers narrower from bottom to top when the column is viewed from the sides which are formed by the multiple sets of scissor members. When the column is viewed from the front, as in FIG. 19, the sides of the column structure are parallel, but the height of each compartment is progressively shorter from the bottom to the top of the column. Thus, a wide base frame 96 is at the bottom of the column, with progressively shorter end frames 98, 100, and 102 at intermediate levels. A short end frame 104 is at the top of the tapered column structure. The end frames 96, 98, 100, 102, and 104 can each comprise one of the interlocking U-frames described previously or they can be straight end braces forming separate rectangular box-frame structures at each level.

The scissor members at the sides of the tapered column structure are not of the same lengths. The pivot pin is not at the center of each scissor member, and the scissor members are progressively shorter from the bottom to the top of the column. The pivot pins 106 that join each pair of scissor members 108 are spaced a short distance above the midpoint of the height of each truncated triangle. At each level, as long as the lengths of the sides of triangles ABC formed by the scissor members are equal to the lengths of the sides of triangles ABC' formed by the adjoining scissor members, the column structure will fold (in the manner described previously with respect to other embodiments of the folding column structure).

FIG. 21 illustrates a further embodiment of the invention in which a pair of parallel truncated triangular frame structures 94 are used as end supports in a freestanding configuration supporting a horizontal bridge frame structure 112. In this embodiment, the truncated triangular frames at the ends of the bridge structure provide a stable means of support. The horizontal bridge 112 can be formed from a multi-cubicle frame structure such as the frames 10 or 80 described previously.

What is claimed is:

1. A collapsible frame comprising one or more frame-like compartments movable to an open, expanded position forming a structurally stable open framework for a long, narrow column structure of a portable display frame, in which the frame-like compartment is foldable in a single direction to a compact closed form for storage of the frame in a transportable form, each compartment of the display frame in its open, expanded position having a front and a rear side, a pair of opposite sides defining the width of the compartment, and a pair of opposite ends, the ends being formed within planes defining corners at each end of the compartment, at least one end of each compartment being shared with a common end of an adjoining compartment in a multi-compartment open frame structure, the opposite sides of the compartment comprising a pair of elongated rigid rods pivotally joined to each other at an intermediate point to form scissor members along the opposite sides of the compartment, the scissor members the on opposite sides of the compartment being substantially parallel to one another, a plurality of hubs at the corners of the compartment, the respective ends of the scissor members being pivotally connected to a corresponding one of the hubs, rigid end brace members at both ends of the compartment secured to and movable relative to the scissor members to an end-bracing position forming a rigid connection between the hubs at the corners of the compartment at each end of the compartment to thereby hold the scissor members at the same corners of the compartment in fixed positions rigidly spaced apart from one another by the joined end brace members, said end-bracing position being formed by the end brace members at each end of the compartment extending rigidly between the pair of hubs at the front corners and the pair of hubs at the rear corners of the compartment, and means for releasably disconnecting the end brace members from their end-bracing position so that the ends of the scissor members at front corners of the compartment are freely movable away from the ends of the scissor members at the rear corners of the compartment, the disconnection of the end brace members permitting the frame to be collapsed into a compact form by folding the scissor members of the compartment in unison about their pivot points so the compartment is collapsed in a single direction along the length of the column and into a compact form in which the scissor members at the sides of the compartment are folded generally parallel to each other, and with the folded scissor members on one side of the frame being rigidly spaced apart by a fixed distance defined by the lengths of the end brace members.

2. Apparatus according to claim 1 in which the end brace members comprise a pair of opposed U-shaped members having the legs of each U rigidly affixed to corresponding hubs at the corners of the compartment with the base portions of each U lying adjacent to one another, and releasable interlocking means on the respective base members of each U-frame for releasably but rigidly joining the base members of the adjacent U-frames to each other to rigidly form the end brace at each end of the compartment.

3. Apparatus according to claim 2 in which the releasable interlocking means comprises a receptacle on the base of one U-frame and a rigid pin on the other U-frame adapted for releasable interconnection to the receptacle.

4. Apparatus according to claim 1 in which the end brace members are rigid members extending between the scissor members on opposite sides of the compartment, perpendicular to the opposite scissor members, and rigid but releasable lateral brace members extending between the ends of the scissor members on each side of the frame.

5. Apparatus according to claim 1 including an elongated diagonal cross-brace rigidly connected and extending from one side of the compartment to the opposite side of the compartment and extending diagonally from a front side of the compartment past the intermediate pivot point of the scissor members to a rear side of the compartment, and in which the ends of the diagonal brace member are rigidly affixed to respective end portions of scissor members on opposite sides of the frame.

6. A collapsible portable display frame for being expanded to a fixed open frame position to form a structurally stable, elongated, narrow column structure for a display frame and for being folded to a compact form for storage in a transportable form, the display frame in its open expanded position comprising a plurality of rod members pivotally joined to hubs at their ends to form frame-like compartments aligned in series end-to-end and pivotally joined to each other at common ends of the compartments, each compartment defining generally parallel first and second sides, generally parallel front and rear sides, and generally parallel top and bottom ends, with separate hubs being located at the corners of each compartment, the first and second sides of the compartment comprising a pair of elongated rigid rods pivotally joined to each other at an intermediate point to form first and second scissor members extending along the first and second sides of the compartment, the respective upper ends of the scissor members each being pivotally joined to corresponding hubs at the upper corners of the compartment, the respective lower ends of the scissor members each being pivotally joined to corresponding ones of the hubs at the lower corners of the compartment, end brace members movable to and releasably secured in a fixed position for rigidly bracing the hubs at the corners of each end of the compartment in a rigid box-like frame structure, the end brace members being releasable to disconnect the box-frame structure so the scissor member ends at the front side of the compartment are movable relative to the scissor member ends at the rear side of the compartment, a first rigid cross-brace rigidly affixed at its ends and extending diagonally from the juncture of the hub and scissor member near the lower front corner of the compartment across the central region of the compartment to the juncture of the hub and scissor member near the upper rear corner of the compartment, and a second rigid cross-brace rigidly affixed at its ends and extending diagonally from the juncture of the hub and scissor member near the upper front corner of the compartment across the central region of the compartment to the juncture of the hub and scissor member near the lower rear corner of the compartment, the first and second diagonal cross-braces bypassing one another in the central region of the expanded frame, the connection of the end brace members in said fixed positions at the upper and lower ends of the compartment maintaining the display frame in a rigid column-like frame structure, the disconnection of the end brace members at each end of each compartment permitting the frame to be collapsed into a compact form by folding the scissor members about their pivot points so the compartments are collapsed into a compact side-by-side form in which the scissor members at the sides of each compartment are folded generally parallel to each other, with the first and second diagonal cross-braces being movable in unison with the scissor members to collapse into a plane defined generally by the collapsed form of the scissor members.

7. Apparatus according to claim 6 in which the end brace members are rigidly affixed to the hubs at the corners of each end of the receptacle and are movable upon pivoting of the hub relative to its corresponding scissor member.

8. Apparatus according to claim 6 in which the ends of the diagonal cross-braces are rigidly affixed to respective end portions of the scissor members.

9. Apparatus according to claim 6 in which the end frame members at each end of the compartment comprise a pair of opposed U-shaped members having the legs of each U rigidly affixed to corresponding hubs at the corners of the compartment, with the base portions of each U lying adjacent to one another, and releasable interlocking means on the respective base members of each U-frame for releasably but rigidly joining the base members of the adjacent U-frames to each other to rigidly form the box frame structure at each end of the compartment.

10. Apparatus according to claim 9 in which the releasable interlocking means comprise a receptacle on the base of one U and a rigid pin on the other U adapted for releasable interconnection to the receptacle.

11. Apparatus according to claim 6 in which the box-frame structure at each end of the compartment comprises rigid front and rear end braces extending rigidly between respective pairs of hubs at the front and at the rear of the compartment, and rigid left and right side end braces rigidly but releasably connected between respective pairs of hubs at the left and right sides of the compartments.

12. A folding display frame movable to an open expanded position forming a series of pivotally interconnected and generally rectangular compartments attached in the shape of a long, narrow column, the frame being movable to a compact closed form for storage in a transportable form, the framework formed by rod members joined at their ends to hubs to form six sides of each compartment and having a separate hub at each of the eight corners of each compartment, each compartment having left and right sides, front and rear sides, and top and bottom ends, the compartments in the column-like frame being joined end-to-end with the width of the column having the width of one compartment, with the ends of adjoining compartments sharing common hubs at the four corners of the adjoining ends of the compartments, the left and right exterior sides of each compartment being formed by rigid rods in the form of left and right scissor members each pivotally joined at an intermediate point, with the ends of the scissor members being pivotally joined to corresponding ones of the hubs at the corners of the upper and lower ends of the compartment, the scissor members in adjoining compartments being on the same opposite sides of the compartments so that adjacent pairs of scissor members in adjacent compartments are aligned end-to-end along opposite left and right exterior sides of the adjoining compartments, end brace members releasably movable between a fixed bracing position at the ends of each compartment and a disconnected position, the end brace members comprising rigid rods supporting the hubs at four corners of each end of the compartment in fixed spaced-apart positions thereby rigidly supporting the four ends of the scissor members in fixed spaced-apart positions between the left and right sides and between the front and rear sides of each compartment, means for disconnecting the end brace means from said hub supporting position to permit the ends of the scissor members and their corresponding hubs at the front side of the frame to be movable relative to the ends of the scissor members and their corresponding hubs at the rear side of the frame, and diagonal cross-brace means comprising one or more rigid rod members in the form of a diagonal brace having one end rigidly affixed near a scissor member and its corresponding hub on a front side of each compartment and an opposite end rigidly affixed near a scissor member and its corresponding hub on a rear side of the same compartment, the diagonal brace extending from the left side to the right side of the compartment, the resulting frame comprised of the multiple compartments being foldable by disconnecting the end brace members in all compartments and folding the frame in a single direction along the length of the column by pivoting the scissor members so the hubs on the front and rear sides of the column frame move away from each other, allowing the sets of scissor members to each move to relatively parallel positions with the pairs of scissor members in adjacent compartments folded adjacent one another in the compact form of the frame, and with the diagonal brace of each compartment being movable in unison with the scissor members of the same cubicle to collapse into a plane defined generally by the collapsed form of the scissor members.

13. Apparatus according to claim 12 in which the end brace members are rigidly affixed to the hubs at the corners of each end of the receptacle and are movable upon pivoting of the hub relative to its corresponding scissor member.

14. Apparatus according to claim 12 in which the ends of each diagonal brace are rigidly affixed to respective end portions of the scissor members on opposite sides of the compartment.

15. Apparatus according to claim 12 in which the end frame members at each end of the compartment comprise a pair of opposed U-shaped members having the legs of each U rigidly affixed to corresponding hubs at the corners of the compartment with the base portions of each U lying adjacent to one another, and releasable interlocking means on the respective base members of each U-frame for releasably but rigidly joining the base members of the adjacent U-frames to each other to rigidly form the box frame structure at each end of the compartment.

16. Apparatus according to claim 12 in which each compartment is shaped as a cubicle.

17. Apparatus according to claim 12 in which the releasable interlocking means comprise a receptacle on the base of one U-frame and a rigid pin on the other U-frame adapted for releasable interconnection to the receptacle.

18. A folding display frame for forming a long column-shaped structure having a plurality of rods joined together in an open display-supporting framework, in which a first pair of scissor members on one exterior side of the open frame are joined with a second pair of scissor members on an opposite exterior side of the frame in a rigid compartment-like frame structure, the first and second pairs of scissor members extending along the length of the compartment on opposite sides of the compartment and defining between them the width of the compartment, the ends of the first and second scissor members terminating at first and second ends of the compartment;
 a plurality of hubs, a separate one of the hubs pivotally joined to an end of each scissor member;
 a corresponding first rigid end frame member of fixed length affixed to the hubs on the ends of the first scissor members and on the ends of the second scissor members at the first end of the compartment;
 a corresponding second rigid end frame member of fixed length affixed to the hubs on the ends of the first scissor members at the first end of the compartment and on the ends of the second scissor members at the second end of the compartment, the first and second end frame members rigidly supporting the ends of the first and second pairs of scissor members laterally in spaced-apart positions at the first and second ends of the compartment, respectively; and
 rigid end support means with cooperating releasable attachments for pivoting with the hubs at the ends of the scissor members and for cooperating with the first and second end frame members for releasably interconnecting the ends of the first and second scissor members in a rigid bracing structure at the first and second ends of the compartment-like frame structure, the end support means being releasable to permit folding of the end support means away from one another to release the rigid bracing structure and thereby permit folding of the scissor members so the column-like compartment can be collapsed in a single direction along the length of the compartment to a compact form.

19. Apparatus according to claim 18 in which the first and second end frame members comprise separate U-shaped frames, with the legs of each U-frame being rigidly affixed to corresponding hubs and the base of each U-frame being positioned adjacent the base of the other U-frame in said rigid bracing structure, the end support means comprising the legs of each U-frame, and including a releasable attachment carried on the base of each U-frame, the base of each U-frame providing said means of lateral rigidity.

20. A collapsible display frame which expands to an open position forming a structurally stable column structure comprising open frame cubicles pivotally joined end-to-end along the length of the column structure, comprising:
 a pair of rigid scissor members extending generally parallel to each other along opposite sides of the cubicle, the scissor members having ends pivotally joined to corresponding hubs at four upper and four lower corners of the cubicle;
 end frame members rigidly supporting the ends of the scissor members as a rigid box frame structure at the upper and lower ends of the cubicle;
 a first diagonal cross-brace member rigidly affixing a lower front end of a scissor member on one side of the cubicle with respect to an upper rear end of a scissor member on an opposite side of the cubicle;
 a second diagonal cross-brace member rigidly affixing an upper front end of a scissor member on one side of the cubicle and a lower rear end of a scissor member on an opposite side of the cubicle, the first and second diagonal cross-brace members bypassing one another in a central region of the cubicle; and
 means releasably disconnecting the end frame means from their rigid box-frame supporting position to permit the ends of the scissor members at the front side of the cubicle to move away from the ends of the scissor members at the rear side of the cubicle so that the scissor members of the adjacent cubicles in the column frame structure can be folded in a single direction along the length of the column to a compact position in which the scissor members are parallel to each other with the folded cubicles adjacent one another in the compact form of the display frame structure.

21. Apparatus according to claim 20 in which the end frame members comprise rigid front and rear frame members extending across front and rear sides of the cubicle between corresponding ends of the scissor members that extend to the front and rear sides of the cubicle, respectively, to resist folding of the frame from front to rear, and rigid left and right frame members extending across left and right sides of the cubicle between corresponding ends of the scissor members that extend to the left and right sides of the cubicle, respectively, to resist folding of the frame from left to right.

22. Apparatus according to claim 20 in which the crossbar members at each end of the cubicle comprise a pair of opposed U-shaped members having the legs of each U-frame rigidly affixed to corresponding hubs at the corners of the cubicle with the base portions of each U-frame lying adjacent to one another, and releasable interlocking means on the respective base members of each U-frame for releasably but rigidly joining the base members of the adjacent U-frames to each other to rigidly form the end brace at the end of the cubicle.

23. Apparatus according to claim 22 in which the releasable interlocking means comprises a receptacle on the base of one U and a removable rigid pin on the other U-frame adapted for releasable interconnection to the receptacle.

24. Apparatus according to claim 20 in which the ends of each diagonal brace member are rigidly affixed to respective end portions of the scissor members.

25. Apparatus according to claim 20 in which the column structure, in its expanded configuration is essentially straight.

26. A collapsible frame comprising one or more frame-like compartments movable to an open, expanded position forming a structurally stable open framework for a long, narrow column structure of a portable display frame, in which the frame is foldable to a compact closed form for storage in a transportable form, each compartment of the display frame in its open, expanded position having a front and a rear side, a pair of opposite sides defining the width of the compartment, and a pair of opposite ends, the ends being formed within planes defining corners at each end of the compartment, at least one end of each compartment being shared with an end of an adjoining compartment in a multi-compartment open frame structure, the opposite sides of the compartment comprising a pair of elongated rigid rods pivotally joined to each other at an intermediate point to form scissor members along the opposite sides of the compartment, the scissor members on the opposite sides of the compartment being substantially parallel to one another, a plurality of hubs at the corners of the compartment, the respective ends of the scissor members being pivotally connected to a corresponding one of the hubs, rigid end brace members at each end of the compartment secured to and movable relative to the scissor members to an end-bracing position forming a rigid connection between the hubs at the corners of the compartment to thereby hold the scissor members at the same corners of the compartment in fixed positions rigidly spaced apart from one another by the joined end brace members, and means for releasably disconnecting the end brace members from their end-bracing position so that the ends of the scissor members at front corners of the compartment are freely movable away from the ends of the scissor members at the rear corners of the compartment, the disconnection of the end brace members permitting the frame to be collapsed into a compact form by folding the scissor members of the compartment in unison about their pivot points so the compartment is collapsed along the length of the column and into a compact form in which the scissor members at the sides of the compartment are folded generally parallel to each other, and with the fold scissor members on one side of the frame being rigidily spaced apart by a fixed distance defined by the lengths of the end brace members, in which the end brace members comprise a pair of opposed U-shaped members having the legs of each U rigidly affixed to corresponding hubs at the corners of the compartment with the base portions of each U lying adjacent to one another, and releasable interlocking means on the respective base members of each U-frame for releasably but rigidly joining the base members of the adjacent U-frames to each other to rigidly form the end brace at each end of the compartment.

27. Apparatus according to claim 26 in which the releasable interlocking means comprises a receptacle on the base of one U-frame and a rigid pin on the other U-frame adapted for releasable interconnection to the receptacle.

28. A collapsible frame comprising one or more frame-like compartments movable to an open, expanded position forming a structurally stable open framework for a long, narrow column structure of a portable display frame, in which the frame is foldable to a compact closed form for storage in a transportable form, each compartment of the display frame in its open, expanded position having a front and a rear side, a pair of opposite sides defining the width of the compartment, and a pair of opposite ends, the ends being formed within planes defining corners at each end of the compartment, at least one end of each compartment being shared with a common end of an adjoining compartment in a multi-compartment open frame structure, the opposite sides of the compartment comprising a pair of elongated rigid rods pivotally joined to each other at an intermediate point to form scissor members along the opposite sides of the compartment, the scissor members on the opposite sides of the compartment being substantially parallel to one another, the frame having the width of one compartment, a plurality of hubs at the corners of the compartment, the respective ends of the scissor members being pivotally connected to a corresponding one of the hubs, rigid end brace members at each end of the compartment secured to and movable relative to the scissor members to an end-bracing position forming a rigid connection between the hubs at the corners of the compartment to thereby hold the scissor members at the same corners of the compartment in fixed positions rigidly spaced apart from one another by the joined end brace members, and means for releasably disconnecting the end brace members from their end-bracing position so that the ends of the scissor members at front corners of the compartment are freely movable away from the ends of the scissor members at the rear corners of the compartment, the disconnection of the end brace members permitting the frame to be collapsed into a compact form by folding the scissor members of the compartment in unison about their pivot points so the compartment is collapsed along the length of the column and into a compact form in which the scissor members at the sides of the compartment are folded generally parallel to each other, and with the folded scissor members on one side of the frame being rigidly spaced apart by a fixed distance defined by the lengths of the end brace members, in which the end brace members comprise rigid longitudinal members extending between the scissor members on opposite sides of the compartment, generally perpendicular to the opposite scissor members, and rigid but releasable lateral brace members extending between the ends of the scissors members on each side of the frame.

29. A collapsible frame comprising one or more frame-like compartments movable to an open, expanded position forming a structurally stable open framework for a long, narrow column structure of a portable display frame, in which the frame is foldable to a compact closed form for storage in a transportable form, each compartment of the display frame in its open, expanded position having a front and a rear side, a pair of opposite sides defining the width of the compartment, and a pair of opposite ends, the ends being formed within planes defining corners at each end of the compartment, at least one end of each compartment being shared with a common end of an adjoining compartment in a multi-compartment open frame structure, the opposite sides of the compartment comprising a pair of elongated rigid rods pivotally joined to each other at an intermediate point to form scissor members along the opposite sides of the compartment, the scissor members on the opposite sides of the compartment being substantially parallel to one another, the frame having the width of one compartment, a plurality of hubs at the corners of the compartment, the respective ends of the scissor members being pivotally connected to a corresponding one of the hubs, rigid end brace members at each end of the compartment secured to and movable relative to the scissor members to an end-bracing position forming a rigid connection between the hubs at the corners of the compartment to thereby hold the scissor members at the same corners of the compartment in fixed positions rigidly spaced apart from one another by the joined end brace members, means for releasably disconnecting the end brace members from their end-bracing position so that the ends of the scissor members at front corners of the compartment are freely movable away from the ends of the scissor members at the rear corners of the compartment, the disconnection of the end brace members permitting the frame to be collapsed into a compact form by folding the scissor members of the compartment in unison about their pivot points so the compartment is collapsed along the length of the column and into a compact form in which the scissor members at the sides of the compartment are folded generally parallel to each other, and with the folded scissor members on one side of the frame being rigidly spaced apart by a fixed distance defined by the lengths of the end brace members, and an elongated diagonal cross-brace rigidly connected and extending from one side of the compartment to the opposite side of the compartment and extending diagonally from a front side of the compartment past the intermediate pivot point of the scissor members to a rear side of the compartment, in which the ends of the diagonal brace member are affixed to respective end portions of scissor members on opposite sides of the frame.

30. A folding display frame for forming a long column-shaped structure having a plurality of rods joined together in an open display-supporting framework, in which a first pair of scissor members on one exterior side of the open frame are joined with a second pair of scissor members on an opposite exterior side of the frame in a rigid compartment-like frame structure;

a plurality of hubs, a separate one of the hubs pivotally joined to an end of each scissor member;

a corresponding first rigid end frame member of fixed length affixed to the hubs on the ends of the first scissor members and on the ends of the second scissor members at the first end of the compartment;

a corresponding second rigid end frame member of fixed length affixed to the hubs on the ends of the first scissor members at the first end of the compartment and on the ends of the second scissor members at the second end of the compartment, respectively, the first and second end frame members rigidly supporting the ends of the first and second pairs of scissor members laterally in spaced-apart positions; and rigid end support means with cooperating releasable attachments for pivoting with the hubs at the ends of the scissor members and for cooperating with the first and second end frame members for releasably interconnecting the ends of the first and second scissor members in a rigid bracing structure at the ends of each compartment-like frame structure, the end support means being releasable to permit folding of the end support means away from one another to release the rigid bracing structure and thereby permit folding of the scissor members so the column-like frame can be collapsed to a compact form;

the first and second end frame members comprising separate U-shaped frames, with the legs of each U-frame being rigidly affixed to corresponding hubs and the base of each U-frame being positioned adjacent the base of the other U-frame in said rigid bracing structure, with the end support means comprising the legs of each U-frame and including a releasable attachment carried on the base of each U-frame, the base of each U-frame providing said means of lateral rigidity.

* * * * *

UNITED STATES PATENT AND TRADEMARK OFFICE
CERTIFICATE OF CORRECTION

PATENT NO. : 5,351,843
DATED : October 4, 1994
INVENTOR(S) : William J. Wichman; David E. Robertson It is certified that error appears in the above-indentified patent and that said Letters Patent is hereby corrected as shown below:

Column 8, line 25, change "alteratively" to
-- alternatively --.

Column 13, line 45, change "members the on" to
-- members on the --.

Column 19, line 67, change "fold" to -- folded --.

Signed and Sealed this

Twenty-second Day of August, 1995

Attest:

BRUCE LEHMAN

*Attesting Officer*    *Commissioner of Patents and Trademarks*